US007556270B2

(12) United States Patent
Friedman

(10) Patent No.: US 7,556,270 B2
(45) Date of Patent: Jul. 7, 2009

(54) FLEXIBLE JOINT FOR MEDICAL TRANSPORT CART

(75) Inventor: Ronald Friedman, Owings Mills, MD (US)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 11/786,109

(22) Filed: Apr. 11, 2007

(65) Prior Publication Data

US 2007/0284837 A1 Dec. 13, 2007

Related U.S. Application Data

(63) Continuation of application No. 11/037,581, filed on Jan. 18, 2005, now abandoned.

(51) Int. Cl.
*B60D 1/34* (2006.01)

(52) U.S. Cl. .................................... 280/47.34; 280/489

(58) Field of Classification Search ............. 280/47.34, 280/47.38, 288.4, 292, 483, 485, 498, 504, 280/656, 489

See application file for complete search history.

(56) References Cited

U.S. PATENT DOCUMENTS 3,876,024 A 4/1975 Shieman et al.
5,898,961 A * 5/1999 Ambach et al. ................ 5/600
6,070,679 A * 6/2000 Berg et al. ................. 180/19.2
6,481,739 B1 11/2002 Newkirk

FOREIGN PATENT DOCUMENTS

WO WO 03/014001 2/2003
WO WO 2004/089730 10/2004

* cited by examiner

*Primary Examiner*—Kevin Hurley
(74) *Attorney, Agent, or Firm*—Roger M. Rathbun

(57) ABSTRACT

A transport cart for attaching to a patient care apparatus, such as an infant care apparatus to move that infant care apparatus from one location to another. The transport cart is dockable to the infant care apparatus forming an overall footprint of the combination transport cart/infant care apparatus. The infant care apparatus has wheels to provide mobility thereto and the transport cart has a rear section with wheels and having a handle to push the transport cart and a front section with wheels that docks with the infant care apparatus. There is a flexible coupling between the front and rear sections of the transport cart that allows the transport cart to rock as it passes over an uneven floor surface, such as an incline or a decline to maintain contact with the floor by the wheels of both the front and rear sections to provide stable movement of the combined transport cart and infant care apparatus as it is rolled over that floor.

7 Claims, 2 Drawing Sheets

FLEXIBLE JOINT FOR MEDICAL TRANSPORT CART

REFERENCE TO RELATED PATENT APPLICATIONS

The present patent application is a continuation application of U.S. Ser. No. 11/037,581, filed Jan. 18, 2005 now abandoned and entitled "FLEXIBLE JOINT FOR MEDICAL TRANSPORT CART" and priority to that parent application is hereby claimed.

BACKGROUND OF THE INVENTION

The present invention relates to a transport cart for transporting a patient care apparatus from one location to another within a medical facility.

During the care of patients in a medical care institution, particularly with the care of infants, the infant is often maintained in a specialized environment contained within an infant care apparatus, such as an incubator or a combination incubator and warmer. An example of an infant incubator is shown and described in U.S. Pat. No. 4,936,824 of Koch et al entitled "Infant Incubator With Air Curtain" and a combination apparatus that combines the function of the infant incubator along with the function of an infant warmer is shown and described in U.S. Pat. No. 6,213,935 of Mackin et al and entitled "Infant Warming Apparatus" and both of which patents are assigned to the assignee of the present application.

In either types of the aforedescribed infant care apparatus, the infant is normally resting on a bed within the apparatus, however, there are times where the infant must be moved from one location to another within that medical facility. While it is, of course possible to remove the infant from the particular infant care apparatus and thereafter transport the infant by means of a separate vehicle, it is more advantageous to move the infant care apparatus itself with the infant still contained therein. In such manner, the various services and treatment being provided to the infant need not be discontinued, such as monitors and the like and also there is less disruption and consequent stress to the infant since the infant can remain in the protective environment throughout the move rather than being removed therefrom during the move and eventual returned back to the protective environment of the original infant care apparatus.

Accordingly, to facilitate or carry out the move of the infant care apparatus containing the infant, there can be used a transport cart that basically docks with the infant care apparatus and both the infant care apparatus and the transport cart are moved, coupled together. The infant care apparatus is thereby disconnected from the normal electrical power and gases, such as oxygen and air, supplied by the medical facility and those basic needs are thereafter provided by the transport cart during the move. The transport cart normally has batteries to supply the electrical power and gas tanks to supply the needed gases to the infant care apparatus. As such, the transport cart and the infant care apparatus are moved together without any loss of service or care to the infant.

One of the difficulties, however, with the use a transport cart that docks with an infant care apparatus is that the combined transport cart and infant care apparatus becomes difficult to traverse inclining and declining surfaces since one or more wheels can be raised off of the surface over which the combined transport cart/infant care apparatus is being moved and there is a corresponding loss of stability and control. Thus, the overall combination transport cart/infant care apparatus is rather unwieldy and is difficult to maneuver over such surfaces such as door portals, ramps and the like.

One proposed solution to the problem is in the use of a specialized flexible coupling that makes the connection between the transport cart and the medical apparatus and is described in U.S. Pat. No. 6,481,739 of Newkirk and entitled "Docking Assembly". In that patent there is shown a pair of spaced-apart leaf springs that join a first piece of medical equipment to a second piece of medical equipment and the use of those leaf springs is stated to enable the combined apparatus to move over even an irregular surface without suffering from unintended decoupling.

It would be therefore advantageous to have an alternate means of allowing a combined transport cart and medical apparatus to traverse over irregular surfaces, including inclines and declines smoothly and easily.

SUMMARY OF THE INVENTION

The present invention relates to a transport cart for use in transporting a patient care apparatus within a medical facility. The invention is applicable to any patient care apparatus where a patient is being maintained in a medical environment, such as a patient bed for adults and the like, but will be more specifically described herein as usable with an infant care apparatus where an infant is being maintained in a protective environment such as an incubator or an infant care apparatus that combines the functions of an incubator and an infant warmer.

Therefore, in accordance with the present invention, there is a transport cart supported on wheels and which is attachable to a wheeled infant care apparatus so that the transport cart can thereby move along with the infant care apparatus through such interconnection. Once affixed together the transport cart provides necessary services such as power and gas supply to the infant care apparatus.

The infant care apparatus typically is supported on casters that, as is normal, swivel about individual vertical axies so that the infant care apparatus can readily be moved in the desired direction across the floor of the medical facility. In the usual situation, the user can push the infant care apparatus so as to relocate that apparatus to the desired location within the facility.

The transport cart is also a wheeled apparatus and has a plurality of casters that also may be rotatable about vertical axies in the movement of the transport cart. As explained, the transport cart normally includes batteries to provide electrical power as well as container(s) of gas which are used to supply those services to the infant care apparatus when it is desired to move the infant care apparatus while continuing the normal operation of the infant care apparatus in support of an infant contained therein.

In such case, the transport cart is docked to the infant care apparatus, that is, the transport cart is wheeled up to the location of the infant care apparatus and affixed thereto by means such as latches or the like so that thereafter both the transport cart and the infant care apparatus are moved together in the joined relationship with the infant care apparatus being supplied with the utilities that are present on the transport cart.

The present invention, therefore, relates to the transport cart, the combination of the transport cart affixed or docked to the infant care apparatus and to a method of bringing about that combination of transport cart and infant care apparatus.

Accordingly, in accordance with the present invention, the transport cart has a rear section having at least one wheel and a front section also having at least one wheel and each of the wheels is preferably a caster that is rotatable or pivotable about a vertical axis in the manner of a standard caster. Alternatively any number of differing types of wheels can be used, it only being of importance that the wheel or wheels allow the infant apparatus and the transport cart to easily be rolled across the floor in order to move the infant apparatus and transport cart over that surface. The front section of the present transport cart faces and docks with the infant care apparatus when the two are affixed together.

In the embodiment disclosed, the front section is adapted to be firmly affixed to the infant care apparatus. The rear section has a grasping device, such as a handle, that can be grasped by the user in order to push the transport cart along the floor as the transport cart thus propels the infant care apparatus along that floor when the transport cart and infant care apparatus are docked together.

There is a flexible coupling that joins the front section and the rear section of the transport cart such that the two sections can flex vertically with respect to each other during the movement of the transport cart/infant care apparatus along the surface of a floor. Since there are wheels on both the front and rear sections of the transport cart, the user can readily push the rear section by means of the handle to move the infant care apparatus that is firmly affixed to the front section. Since the front section is affixed to the infant care apparatus with the rear section affixed to the front section through the flexible coupling, the rear section is free to flex vertically as the combined transport cart/infant care apparatus moves over an uneven floor, such as an incline or a decline and both the wheel or wheels in the front section and the wheel or wheels in the rear section can maintain contact with the floor surface, thereby better stabilizing movement of the transport cart/infant care apparatus and improving the steerability thereof.

As a further feature or advantage of having the flexible coupling between the front and rear sections of the transport cart, that flexible coupling can include dampers or linear springs in the design to retard or limit the vertical flexing allowed by the coupling and thus the vertical movement of the infant care apparatus and the transport cart with respect to each other. By such means, the amount and extent of flexing can be customized to the particular configuration and the flexing only be permitted where there is a large load placed on the combined transport care/infant care apparatus. The dampers or linear springs also can prevent the coupling from flexing excessively and eliminate the coupling from flexing when not intended. There can also be a mechanical feature built into the coupling that limits the movement of the combined apparatus.

These and other features and advantages of the present invention will become more readily apparent during the following detailed description taken in conjunction with the drawings herein.

DETAILED DESCRIPTION OF THE INVENTION

Figure 1:
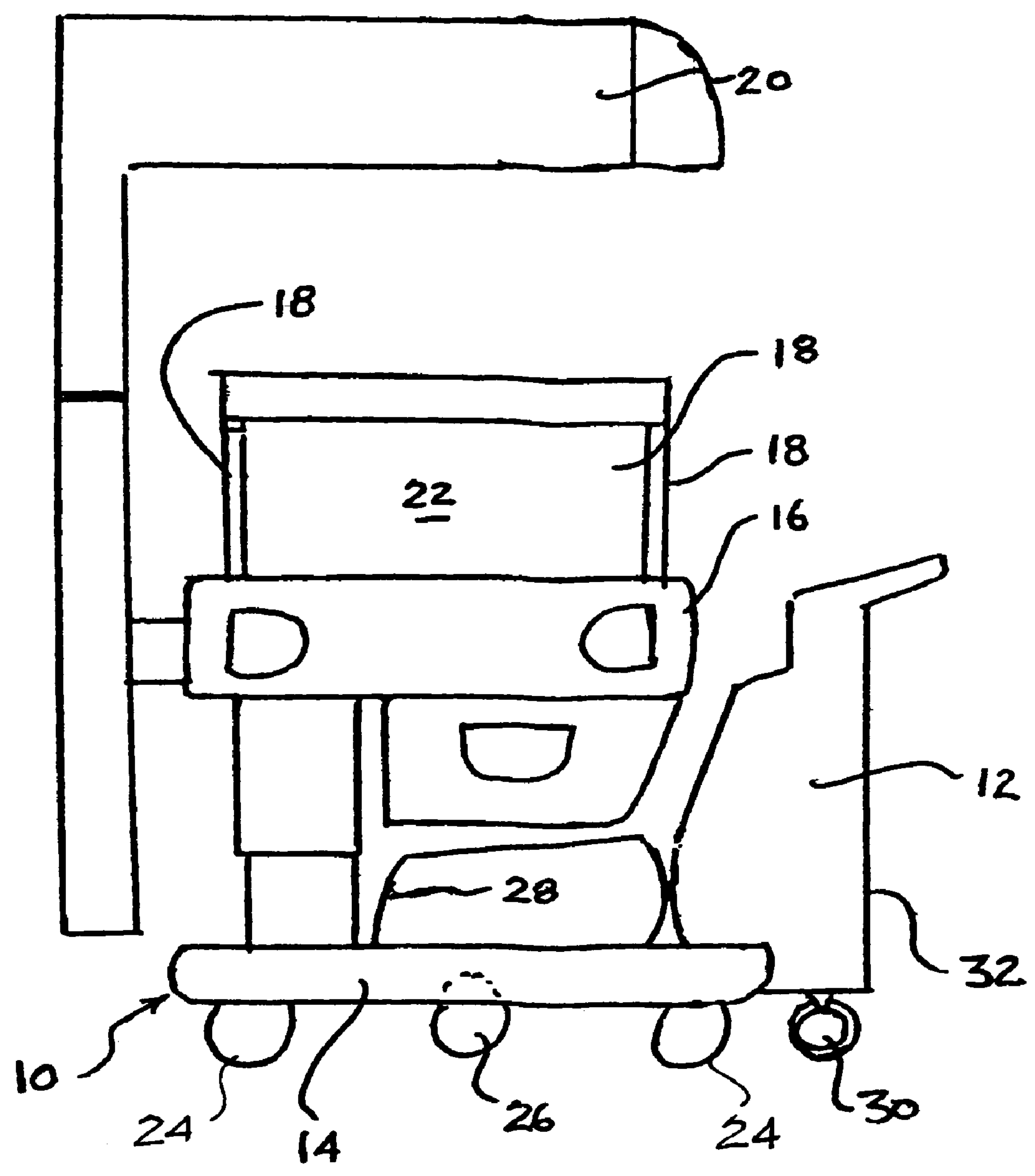
FIG. 1 is a schematic side view of an infant care apparatus having a transport cart coupled thereto.

Referring now to FIG. 1, there is shown a perspective view of an infant care apparatus 10 that is coupled to a transport cart 12 constructed in accordance with the present invention. It should be noted that the present invention is described specifically with respect to an infant care apparatus, however, the present invention is equally applicable to other patient care apparatus that support a patient while that patient is undergoing treatment and where a source of electrical power is required to power various devices that provide care and/or monitor the status of the patient, including adult beds or other such apparatus. Those devices requiring electrical power may be incorporated into the patient care apparatus or may be simply mounted onto the patient care apparatus and therefore move with the patient care apparatus when the patient care apparatus is moved from one location to another location carrying the patient.

Accordingly, as can be seen, the infant care apparatus 10 can be constructed in accordance with the aforementioned U.S. Pat. No. 6,213,935 of Mackin et al and which basically comprises a base 14 that supports an infant platform 16 for supporting the infant. A plurality of transparent walls 18 surround the infant when positioned on the infant platform 16 and a vertically movable canopy 20 is positioned over the upper peripheral edge of the transparent walls 18 to form an infant compartment 22 therein for providing the controlled atmosphere for the infant including control of the temperature and humidity within the infant compartment 22. In FIG. 1, the vertically movable canopy 20 is illustrated in its upper position, however, it can be lowered to a lower position enclosing the infant compartment 22 in accordance with the aforementioned Mackin et al U.S. patent.

The infant care apparatus 10 has a plurality of wheels 24 to enable the infant care apparatus 12 to be readily rolled from one location to another within the hospital environment. The wheels 24 can be of the conventional type where the wheels 24 are conventional casters comprising small rollers that rotate about a horizontal axis where that horizontal axis is free to swivel or rotate about a vertical axis. The small roller is offset with respect to the vertical axis to allow the small roller to both swivel and rotate to allow the infant care apparatus 10 to be moved omni-directionally within the health care facility. Other types of wheels can be used that will also allow the infant care apparatus 10 to be rolled over the surface of the floor of the facility.

The transport cart 12 also has at least one front wheel 26 located at the front 28 of the transport cart 12 and at least one rear wheel 30 located at the rear 32 of the transport cart 12. Again, preferably the front and rear wheels 26, 30 can be conventional casters. As used herein, the portion of the transport cart 12 that faces, and thus enters underneath the infant care apparatus 10 as the transport cart 12 is docked to the infant care apparatus 10 will be referred to as the front 28 and the portion of the transport cart 12 that faces away from the infant care apparatus 10, when docked thereto, will be referred to as the rear 32 . As can be seen, there may be a plurality of front wheels 26 and/or rear wheels 30 supporting the transport cart 12.

The transport cart 12 is adapted to be affixed or docked to the infant care apparatus 10 so that the transport cart 12 can be used to move the infant care apparatus 10 from one location to another within the hospital environment. During that transit, the transport cart 12 provides the electrical power along with other utilities to the infant care apparatus. As an example, there can be oxygen or other gas cylinders carried by the transport cart 12 for use by the infant during the transit thereof since the infant care apparatus 10 is otherwise cut off from its normal supply of oxygen from the hospital central supply.

Figure 2:
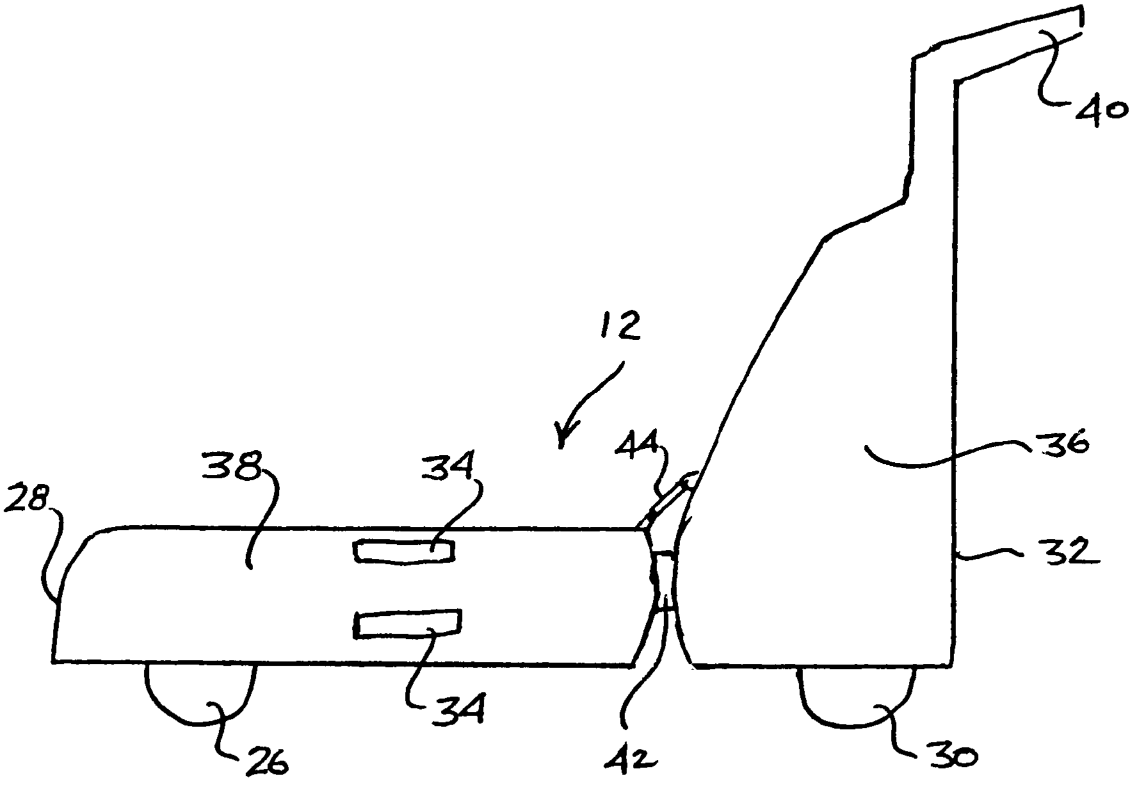
FIG. 2 is a side schematic view of a transport cart illustrating the present invention.

Turning now to FIG. 2, taken along with FIG. 1, there is shown a side schematic view of the transport cart 12 that is adapted to be affixed to the infant care apparatus 10 and there is some affixation means such as latches 34 or other devices to affix the transport cart 12 to the infant care apparatus 10 so that the two apparatus can travel together in order to move the infant care apparatus 10 containing the infant being treated from one location to another while still supplying the necessary service to maintain the infant under the desired conditions.

With the present invention, the transport cart 12 is comprised of a rear section 36 and a front section 38. The rear section 36 includes a grasping device, such as handle 40 that the user uses to push the transport cart 12 in moving the transport cart 12 and infant care apparatus 10 affixed together. Therefore, in the normal movement of the combination transport cart/infant care apparatus, the user pushes or pulls on a handle 40 on the transport cart 12 and steers the combination transport cart/infant care apparatus around the hospital facility by moving that handle 40 to the left or the right.

As also can be seen, there is a flexible coupling 42 that is located intermediate the rear section 36 and the front section 38 of the transport cart 12 and which provides a flexible connection between those sections to allow a vertical flexing between the front section 38 and the rear section 36 at the coupling so as to create a rocking action of the transport cart 12 itself. The flexible coupling 42 can be of a variety of conventional couplings including springs and the like that allow the connection between the front section 38 and the rear section 36 to pivot along a generally horizontal line passing between the front section 38 and the rear section 36 at that flexible coupling 42.

Accordingly, with the front section 38 firmly affixed to the infant care apparatus 10, the only connection between the rear section 36 and the infant care apparatus 10 is through the flexible coupling 42 so that the rear section 36 can basically rock as the combined transport cart 12 and infant care apparatus 10, when joined together, can pass over inclined and declined surfaces or other differences in the floor surface with a rocking action between the front and rear sections 38, 36 to allow the front wheel 26 and the rear wheel 30 to remain securely in contact with the floor to provide stability to the apparatus as it is pushed by the user against the handle 40.

The flexible coupling 42 can include dampers or linear springs 44 in order to retard or limit the vertical flexing at the coupling and thus the movement of the infant care apparatus 10 with respect to the transport cart 12. By such means, the amount and extent of flexing can be customized to the particular configuration and the flexing only be permitted where there is a large load placed on the combined apparatus. The dampers or linear springs 44 also can prevent the flexible coupling 42 from flexing excessively and eliminate the flexing of the flexible coupling 42 when not intended. There can also be a mechanical feature built into the flexible coupling 42 that limits the flexing movement of the combined apparatus.

Those skilled in the art will readily recognize numerous adaptations and modifications which can be made to the transport cart of the present invention which will result in an improved capability of the combination of a transport cart and infant care apparatus to be moved over uneven floor surfaces including inclining and declining surfaces yet all of which will fall within the scope and spirit of the present invention as defined in the following claims. Accordingly, the invention is to be limited only by the following claims and their equivalents.

What is claimed is:

1. A transport cart for transporting a patient care apparatus for supporting a patient across the surface of a floor, said transport cart comprising a rear section having at least one rear wheel and a front section having at least one front wheel, said front section having an affixation means for affixing the transport cart to the patient care apparatus, and the rear section having a grasping device to allow a user to grasp and push the transport cart, and a flexible coupling located between the at least one front wheel of the front section and the at least one rear wheel of the rear section to allow the front and rear sections of the transport cart to flex vertically at the flexible coupling of the transport cart to enable the transport cart to move the patient care apparatus over uneven surfaces while maintaining contact with the floor surface by said at least one front and rear wheels.

2. The transport cart as defined in claim 1 wherein said transport cart is adapted to be affixed to an infant care apparatus.

3. The transport cart as defined in claim 2 wherein said front section is adapted to be rigidly affixed to an infant care apparatus.

4. The transport cart as defined in claim 2 wherein said at least one wheel of said rear section and said at least one wheel of said front section are casters.

5. The transport cart as defined in claim 4 wherein the at least one wheel of said rear section comprises a plurality of casters.

6. The transport cart as defined in claim 2 wherein the flexible coupling comprises a linear spring.

7. The transport cart as defined in claim 2 wherein the flexible coupling limits the vertical motion of the transport cart and infant care apparatus.

* * * * *